June 3, 1958 L. C. ANNIS 2,836,951
PNEUMATIC COTTON HARVESTER UNIT
Filed Dec. 19, 1955
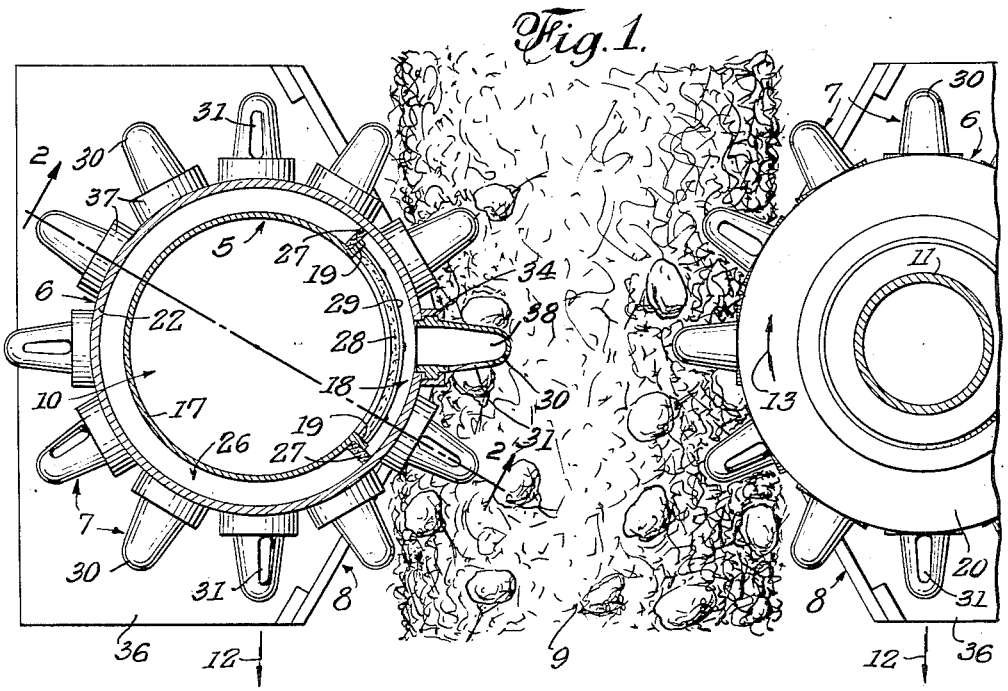
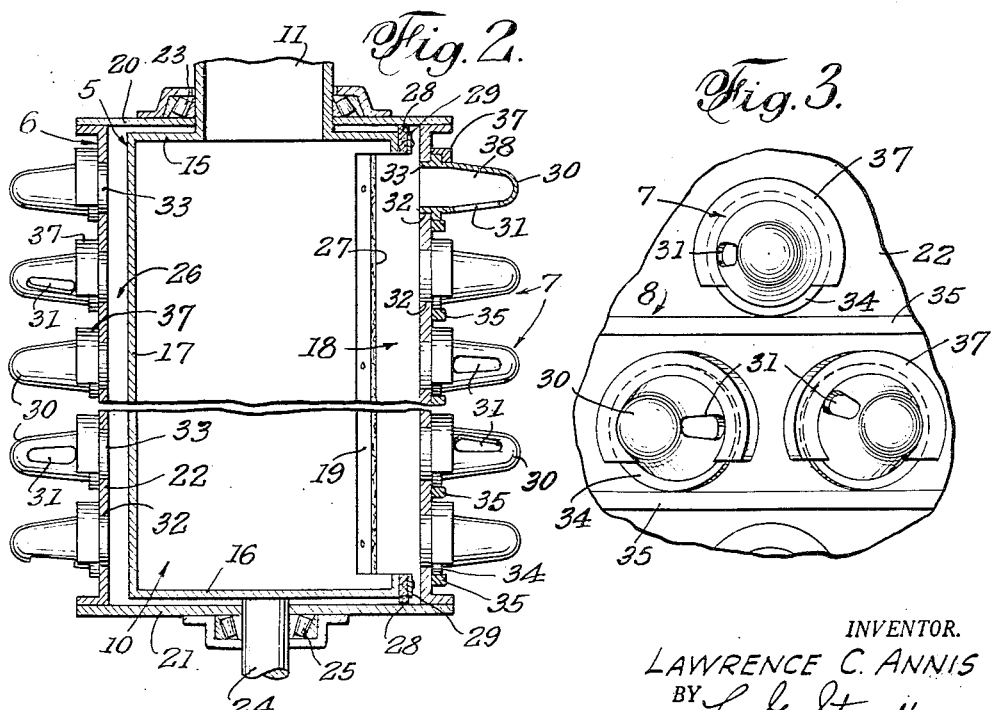
INVENTOR.
LAWRENCE C. ANNIS
BY C. G. Stratton
ATTORNEY

United States Patent Office 2,836,951
Patented June 3, 1958

2,836,951

PNEUMATIC COTTON HARVESTER UNIT

Lawrence C. Annis, Bakersfield, Calif.

Application December 19, 1955, Serial No. 553,809

9 Claims. (Cl. 56—30)

This invention relates to cotton picker mechanism and deals more particularly with a unitary device of the type that is provided in cotton-picking machines.

The present invention is characterized by simplicity of construction and contemplates the provision of a picker unit or units that move through rows of cotton plants and, by application of suction, pull the bolls from the plants and convey them directly to storage. It is an object of the present invention to provide such a cotton picker unit that embodies a plurality of suction nozzles and provides for axial rotation of such nozzles. Thus, the present invention embodies nozzles that have a greater field or area of effectiveness than is the case with nozzles that are fixed.

Another object of the invention is to provide a cotton picker unit that is moved along the rows of cotton plants and, in addition, is rotated bodily on a vertical axis, thus presenting the several nozzles of said unit in boll-extracting position, and further embodies means to rotate the individual nozzles on their own axes to provide the range of effectiveness above mentioned.

A further object of the invention is to provide novel and simple means for effecting the mentioned axial rotation of the nozzles.

The invention has also for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a plan sectional view, with parts broken away and shown in section, of a pair of cotton picker units so arranged in a cotton-picking machine, the same being shown as engaged with a row of cotton plants to pick bolls from said plants.

Fig. 2 is a vertical sectional view across the line 2—2 of Fig. 1, and partly broken away, of one of the units of said pair, the other unit being similar but opposite.

Fig. 3 is an enlarged and fragmentary elevational view of the nozzles of said units.

The picker unit that is illustrated comprises, generally, a housing 5 that is adapted to be affixed to a cotton-picking machine, a revoluble cylinder or drum 6 around and substantially enclosing said housing, a multiplicity of similar nozzles 7 carried by the drum, and means 8 to axially rotate said nozzles on their individual axes while the drum is rotating on its axis.

It is to be understood that two such units may be arranged as an opposed pair on either side of a row of cotton plants 9 (Fig. 1). Also, that two or more pairs may be arranged in tandem. Although a cotton-picking machine is not illustrated, it is to be understood that such a machine mounts the picker units to move them bodily along a row of plants; that such a machine is provided with a storage bin for the cotton bolls; and that the machine embodies suction-producing means that creates low or negative pressure in the interior 10 of housing 5. Said housing is provided with an upwardly directed outlet conduit 11 through which the suction is applied.

The arrows 12 represent the direction of movement of the units bodily and the arrow 13 indicates that the axial rotation of both units that are shown, relative to the plants 9, is counter to the direction of bodily movement. Such rotation of the drum 6 is provided so as to produce a sequential engagement of the nozzles 7 with the row of plants 9. Since the nozzles 7 extend radially outward from the drum, the same constitute cog-like elements. Consequently, a drive for the drum may be omitted because the intermesh of the nozzles with the brush and foliage of the plants induces rotation of the drum in the indicated direction. Of course, an independent drive for the drums 6 may be provided, if desired.

The housing 5 comprises end walls 15 and 16 of preferably circular form, and a connecting cylindrical wall 17. Tube 11 centrally connects to wall 15. A portion of cylindrical wall 17 is removed to provide the housing with a lateral opening 18 that extends for substantially the full height of said housing. The side edges of said opening 18 are defined by outwardly bent flanges 19. In substantially this manner, the interior 10 of the housing is provided with an elongated lateral opening.

The drum 6 comprises end walls 20 and 21, respectively above and below walls 15 and 16, and a cylindrical wall 22 connecting walls 20 and 21 and encircling wall 17 of the housing. Thus, the drum 6 encloses housing 5.

Wall 20 has a central opening through which tube 11 extends and an anti-friction bearing 23 is provided between said tube and wall. Wall 21 has a central opening for a central shaft 24 that extends downward from housing wall 16, and an anti-friction bearing 25 is provided between said shaft and wall 21. In this manner, drum 6 is mounted to freely revolve around housing 5. It will be realized that both tube 11 and shaft 24 may be held in fixed position in any suitable manner. In the present case, wall 22 has space clearance from wall 17, as indicated by space 26. The mentioned flanges 19 extend partly across said space, as shown in Fig. 1.

As contemplated herein, the opening 18 and, therefore, the interior 10 of the housing, is sealed off from that portion of space 26 that extends between flanges 19 on either side of opening 18. In the present instance, the sealing means comprises a felt strip or the like 27 secured to each flange 19 and having wiping engagement with the inner surface of drum 6, and similar strips 28, one above opening 18 and one below, carried by the housing and in respective wiping engagement with walls 20 and 21. A metal band 29 is used to secure strips 28 in place. In this manner, opening 18 is circumscribed by strips 27 and 28 so that housing interior 10 is in communication only with that portion of the inner surface of drum 6 that is opposite said opening.

The nozzles 7 extend radially outward from wall 22 of drum 6. The same may be arranged in any suitable way. As shown, they are arranged in staggered rows so that the nozzles of adjacent rows overlap vertically to insure that the entire height of the cotton plants within the range of the picker is in contact with one or more of the nozzles as the picker progresses therealong and subject to the suction applied to the nozzles through tube 11, interior 10 and opening 18.

Each nozzle 7 has a preferably conical form, is interiorly hollow at 38, and has a closed, preferably rounded, outer end 30. A single, longitudinal slot 31 is provided in the side of each nozzle.

The nozzles 7 are mounted on drum wall 22 which is formed to have openings 32 into which the inner ends 33 of the nozzles extend. Thus, the interiors of the nozzles are in direct communication with the interior of the drum, and those nozzles between the sealing strips 27 in communication with the opening 18 and the interior 10 of housing 5.

The nozzles are retained in radial rotational position by a flanged collar 37 that is affixed to the outer face of drum wall 22 in concentricity with each of the openings 32. An annular flange 34 on each nozzle is engaged in each said collar 37 to provide the rotational interengagement between the nozzles and the drum.

The means 8 is shown as a rail or track 35 that is positioned to engage the flanges 34 of the different banks of nozzles, as best seen in Fig. 3. The engagement between the rail 35 and the nozzles 7 may be frictional, substantially as shown. It will be seen from Fig. 3 that the collars 37 are so formed as to expose the flanges 34 where the latter engage the rails 35.

Said rails also constitute guards, being so formed as to pilot the units into engagement with the row of plants 9. As shown in Fig. 1, said rails 35 are positioned in such orientation to opening 18 that only the nozzles aligned with said opening are engaged with the rails to be rotated thereby. The rails 35 may be mounted on a frame 36 in any suitable manner.

From the foregoing, it will be seen that, as the picker unit progresses along a row of cotton plants, there is a sequential communication of the nozzles 7 with the bolls on said plants so that the only nozzles subject to suction are those engaged with the plants, the remainder being sealed off from the suction. As the drum 6 revolves, new nozzles achieve such engagement in the sequential manner described.

Since the nozzles may axially rotate one or more turns while the suction is effective thereon, the slots 31 of said nozzles achieve positions effective to draw bolls into the unit from above, below, in front, and to the rear. Thus, the efficiency of the picker is quite high because the great majority of bolls that are in the vicinity of the nozzles will be drawn thereinto.

While the foregoing has illustrated and described what is now contemplated to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. A cotton picker unit comprising a fixed housing having a side opening and to the interior of which suction is adapted to be applied, a revoluable drum around and spaced from the housing, sealing means between said housing and said drum, said means circumscribing the mentioned side opening, a multiplicity of radially outwardly directed nozzles each having a side opening therein and rotationally carried by the drum and subject to the suction in the interior of said housing when in register with said side opening, and means to rotate the nozzles on their respective axes, said latter means comprising a rail having frictional engagement with said nozzles as they are rotated by the opening in the housing.

2. A cotton picker unit according to claim 1: said nozzles being arranged in tiers one above the other to constitute cogs having intermesh with a row of cotton plants to induce rotation of the drum during progress of the picker units alongside said row of plants, and the nozzle-rotating means being provided for each respective tier.

3. A cotton picker unit comprising a fixed housing having a side opening and to the interior of which suction is adapted to be applied, a revoluable drum around and spaced from the housing, sealing means between said housing and said drum, said means circumscribing the mentioned side opening, a multiplicity of radially outwardly directed nozzles each having a side opening therein and rotationally carried by the drum and subject to the suction in the interior of said housing when in register with said side opening, and a set of rails frictionally engaged with the nozzles to rotate the same on their axes as they are rotated past the opening in the housing.

4. A cotton picker unit comprising a fixed housing having a side opening and to the interior of which suction is adapted to be applied, a revoluble drum around and spaced from the housing, sealing means between said housing and said drum, said means circumscribing the mentioned side opening, a multiplicity of radially outwardly directed nozzles each having a side opening therein and rotationally carried by the drum and subject to the suction in the interior of said housing when in register with said side opening, each said nozzle being provided with an annular flange, and a set of fixed rails engaged with said flanges to rotate the nozzles on their axes as they are rotated past the opening in the housing.

5. In a cotton picker unit having a fixed housing with a side opening therein and a revoluble drum surrounding said housing, the interior of said unit being subject to suction, the improvement therewith comprising a multiplicity of radially end-enclosed hollow nozzles rotationally carried by said drum, each nozzle having a longitudinal slot opening into the hollow portion thereof, said hollow portions being subject to the suction in the drum when rotated past the mentioned opening in the housing, and fixed means engaged with the nozzles to rotate the same on their respective axes during the revolution of the drum, said fixed means being external of the nozzles.

6. In a cotton picker unit having a fixed housing with a side opening therein and a revoluble drum surrounding said housing, the interior of said unit being subject to suction, the improvement therewith comprising a multiplicity of radially end-enclosed hollow nozzles rotationally carried by said drum, each nozzle having a longitudinal slot opening into the hollow portion thereof, said hollow portions being subject to the suction in the drum when rotated past the mentioned opening in the housing, and fixed rails engaged with the nozzles to rotate the same on their respective axes during revolution of the drum, said rails rotating the mentioned slots through at least a full revolution as the nozzles are rotated past said opening.

7. In a cotton picker unit having a fixed housing with a side opening therein and a revoluble drum surrounding said opening, said unit being subject to suction, the improvement therewith comprising a plurality of nozzles rotationally carried by said drum, each nozzle having a hollow portion opening into the interior of said unit when the drum is rotated past the mentioned opening, each nozzle having a side opening in communication with the hollow portion thereof, a flange on each nozzle adjacent the end thereof mounting the nozzle on the drum, means on said drum engaging said flange to hold the nozzles on the drum as they are rotated, and fixed means engaged with said flanges to rotate the same on their axes as the nozzles are rotated past the mentioned opening in the housing, said fixed means being external of the nozzles.

8. In a cotton picker unit according to claim 7: in which the fixed means comprises a set of rails, there being several tiers of nozzles and one rail for each tier, said rails rotating the nozzles at least 360° as the nozzles pass the opening.

9. In a cotton picker according to claim 6, each nozzle being conically tapered toward its closed end.

References Cited in the file of this patent

UNITED STATES PATENTS

| | | |
|---|---|---|
| 858,371 | Corley | July 2, 1907 |
| 1,225,193 | Vittetoe | May 8, 1917 |
| 1,845,431 | Martin | Feb. 16, 1932 |
| 2,058,513 | Rust et al. | Oct. 27, 1936 |
| 2,493,564 | Arneson | Jan. 3, 1950 |